United States Patent [19]
Krantz

[11] Patent Number: 5,809,781
[45] Date of Patent: Sep. 22, 1998

[54] NEUTRAL FLOW BY-PASS VALVE FOR HYDROSTATIC TRANSMISSION

[75] Inventor: William Douglas Krantz, Ft. Wayne, Ind.

[73] Assignee: Dana Corporation, Toledo, Ohio

[21] Appl. No.: 773,058

[22] Filed: Dec. 24, 1996

[51] Int. Cl.⁶ .................................................. F16D 31/02
[52] U.S. Cl. .............................. 60/489; 60/468; 91/497
[58] Field of Search ...................... 60/489, 468; 91/497

[56] References Cited

U.S. PATENT DOCUMENTS

| | | | |
|---|---|---|---|
| 3,020,890 | 2/1962 | Grad | 91/497 |
| 4,091,717 | 5/1978 | Bojas et al. | 91/498 |
| 4,896,506 | 1/1990 | Shivvers et al. | 60/487 |
| 4,968,227 | 11/1990 | Szulczewski et al. | 417/440 |

*Primary Examiner*—Sheldon Richter
*Attorney, Agent, or Firm*—Oldham & Oldham Co., L.P.A.

[57] ABSTRACT

A neutral by-pass for hydraulic fluid in a hydrostatic transmission is provided by an essentially closed conduit comprising a pair of bores and a channel communicating the pair of bores, all formed in the cam ring of the transmission. When the neutral point is attained, the bores will be communicated with oil dampening pistons in communication with the hydraulic fluid supply passages and the fluid pressure between the passages will be equalized. This will operate from either the forward or reverse direction. As the cam ring is angularly moved, essentially closed conduit is moved away from the dampening pistons, so there can be no fluid flow therethrough. When this occurs, all fluid flow goes to the motor rotor, causing output rotation.

5 Claims, 4 Drawing Sheets

NEUTRAL FLOW BY-PASS VALVE FOR HYDROSTATIC TRANSMISSION

The present invention relates to an improvement for a hydrostatic transmission, especially a hydrostatic transmission as used in a motor vehicle, such as a lawn tractor or the like. More particularly, the present invention relates to a system for diverting or by-passing hydraulic oil away from the motor rotor of the hydrostatic transmission, thereby preventing output axle rotation. This helps to prevent a situation known as "creep."

BACKGROUND OF THE ART

The use of hydrostatic transmissions in relatively small lawn and garden tractors is well known. One example of a vehicle which has used a prior art hydrostatic transmission is a mid-mount lawn tractor having an engine, front and rear wheels and a working implement or lawn mower mounted between the front and rear wheels. In the past, operators of such vehicles have encountered difficulty in putting the transmission of the vehicle into a true "neutral" position when the vehicle is in either a "forward" or "reverse", since the ability to put the transmission into the neutral position really involves putting a rotary fluid pressure pump contained within the transmission into a neutral position, and this further involves the rotation of a manual control shaft, which controls the position of the cam ring of the pump element. Since a small rotation of the control shaft may result in a relatively large movement of the cam ring, precise location of the neutral point may be difficult. Even when the control shaft can be accurately centered, the possibility of vehicle creep still exists if hydraulic fluid is able to flow from the pump rotor to the motor rotor and provide output axle rotation.

In copending applications by the same inventor and assigned to the same entity, other improvements relating to hydrostatic transmissions of this type have been disclosed. In Ser. No. 08/661,299 dated 13 Jun. 1996, an internal oil expansion chamber for the transmission is described. In Ser. No. 08/685,500 dated 24 Jul. 1996, a gear drive disconnect is described which enables the connection between the motor rotor and the output drive train to be selectively mechanically disrupted, so that the vehicle may "free wheel", as may be necessary for towing, without overcoming viscous resistance of the hydraulic fluid, particularly at low temperatures. In Ser. No. 081717,231 dated 26 Sep. 1996, a neutral centering device is described which enables a vehicle operator to more easily find the neutral position by providing a detented ramp into which a portion of a control pin associated with the control shaft may be seated. This provides a positive "feel" to the neutral position. In Ser. No. 08/747,326 dated 12 Nov. 1996, a coupling assembly between a hydrostatic transmission and a gear axle are described.

Improvements such as these have made hydrostatic transmissions better, but even when a neutral centering device as described in copending application cited above is used and provides a positive neutral position, the manufacturing tolerances in the neutral centering device may allow some vehicle creep. This creep may be attributed to internal leakage paths which are not completely precluded.

SUMMARY OF THE INVENTION

It is therefore an object of the present invention to provide a neutral flow by-pass for a hydrostatic transmission which bleeds off high pressure hydraulic fluid used to drive the motor rotor of the transmission and which returns the oil directly to the pump rotor. This and other objects of the invention are accomplished by a variable displacement rotary fluid pressure pump of the type including a housing assembly and a pair of confronting, axially spaced transverse housing surfaces; a cam ring disposed between the housing surfaces, the cam ring being pivotable about a fixed point to define a neutral position, and a plurality of displaced positions in response to rotation of a manual control shaft; a rotor assembly disposed within said cam ring, and defining a pair of radially extending bores with a piston having a restricted opening disposed in each of said bores, one of the bores in each of a pair of passages for providing fluid from the rotor assembly to an output drive and returning the fluid to the rotor assembly; the housing assembly including means operable to support the rotor assembly relative to the housing assembly, for rotation about an axis; the housing assembly and the support means cooperating to define fluid passages for directing fluid to the bores, and further cooperating to define outlet fluid passages for directing fluid from certain other of the bores; characterized by: the cam ring having a pair of bores therethrough, with a channel formed on a first surface of the cam ring communicating the pair of bores; the cam ring and an inner surface of the housing assembly cooperating in close proximity to effectively close the periphery of the channel and provide an essentially closed conduit between the bores; the essentially closed conduit defining a fluid passage within the cam ring; and the restricted openings in the pistons being disposed such that, when the cam ring is in any of the plurality of displaced positions, fluid communication between the restricted openings is substantially prevented and, as the cam ring is displaced from the displaced position toward the neutral position, fluid communication between the restricted openings is gradually opened.

BRIEF DESCRIPTION OF THE DRAWINGS

Better understanding of the present invention will be had by reference to the accompanying drawings, wherein identical parts are identified by identical reference numerals and wherein.

DETAILED DESCRIPTION OF THE PREFERRED EMBODIMENT

Figure 1:
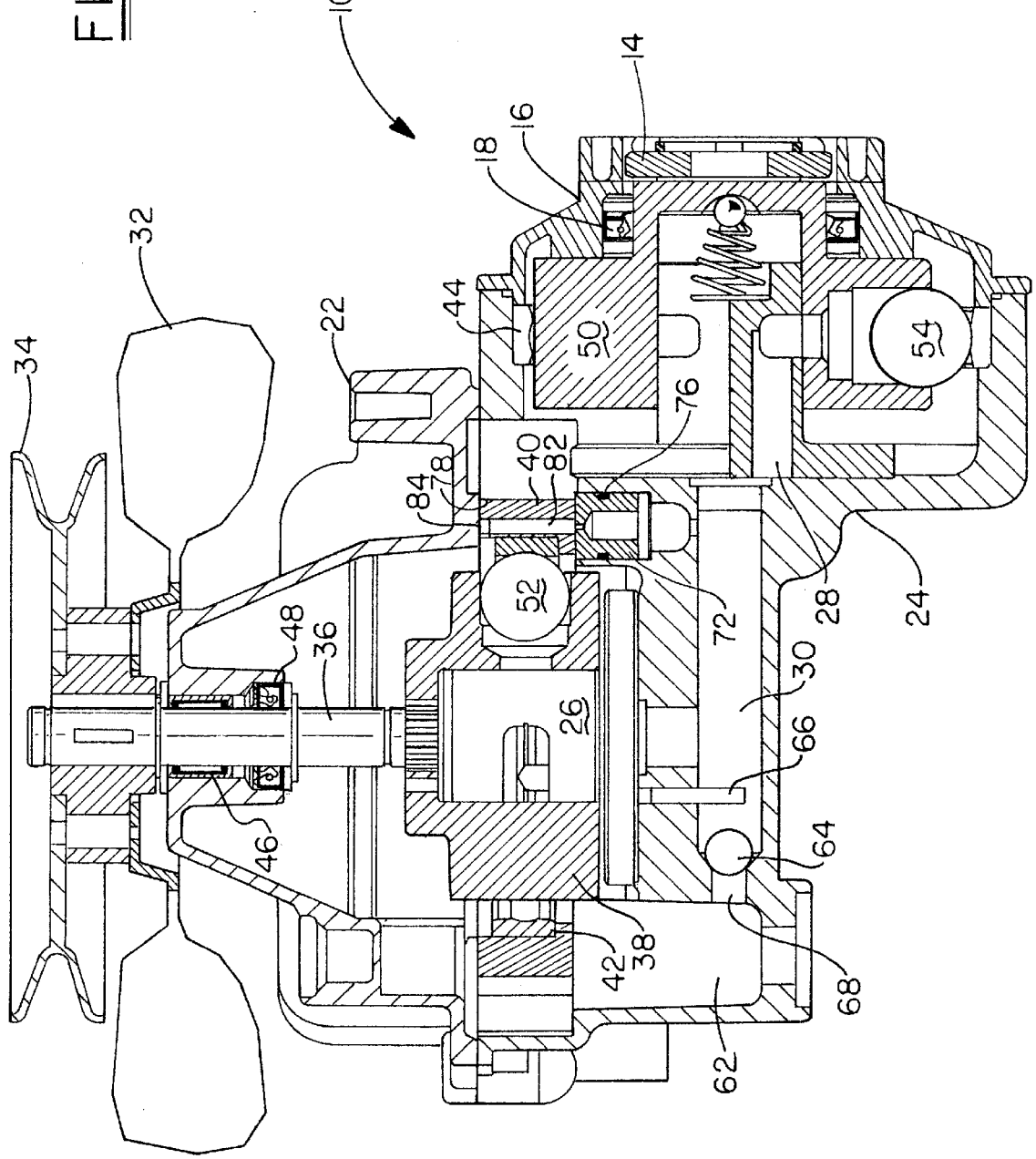
FIG. 1 shows a cross-section side view of a vehicle hydrostatic transmission incorporating the by-pass system of the present invention.
Figure 2:
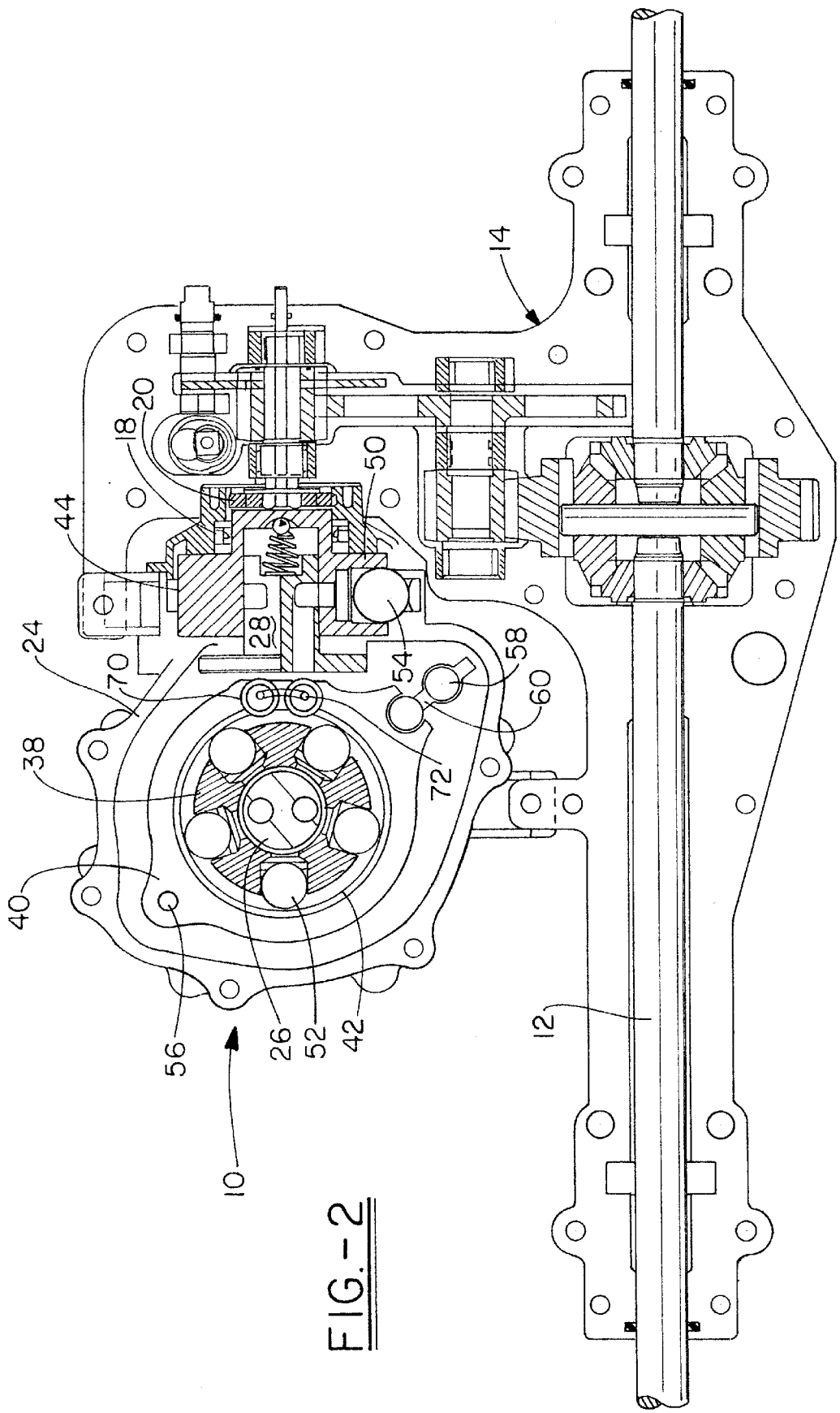
FIG. 2 shows in cross-sectional top view the transmission of FIG. 1.

Referring to FIGS. 1 and 2, the general structures of a hydrostatic transmission 10 for a vehicle are shown. The transmission 10 is shown generally isolated from the gear axle 12 and drive train housing 14 in FIG. 1, but these are shown in FIG. 2 and reference thereto reveals how torque passing through the transmission moves to the gear axle. An output cover 16 and an output shaft seal 18, which is preferably a radial lip seal, are used to separate the transmission 10 from the drive train housing 18 by sealing in lubricating grease for splined drive key 20 on one side of the seal and to seal in hydraulic oil used in the transmission on the opposite side. Output covers 16 is preferably not rigidly fixed to drive train housing 18 due to potential sealing problems.

The transmission 10 generally includes three housings: the output cover 16, an input cover 22 and a main housing 24. Each of these are preferably separate die cast parts. They are typically provided with flanged holes for being bolted together. Main housing 24 contains a pump pintle 26 and a motor pintle 28 which are secured to main housing 24 by a series of bolts (not shown). Pump pintle 26 and motor pintle 28 communicate hydraulically through cast and machined passages 30 integral to main housing 24. Input power enters the transmission 10 through a fan 32 and pulley 34 assembly coupled about splined input shaft 36 which is mechanically connected to a pump rotor 38. Hydraulic flow is achieved through this pump rotor 38, which is rotatably mounted on pump pintle 26. The position of pump rotor 38, cam ring 40 and pump race 42 determine the direction of hydraulic flow and hence whether the output direction is forward or reverse. Motor race 44 connects with main housing 24.

A needle bearing 46 is typically used rather than ball bearings, to support and align splined input shaft 36. Input shaft seal 48, preferably a radial lip seal, is located just below needle bearing 46 and provides a seal for retaining hydraulic fluid in the transmission housing.

Splined input shaft 36 transfers mechanical energy to pump rotor 38, which converts this mechanical energy into hydraulic energy and transfers the hydraulic energy to motor rotor 50, which is rotatably mounted on motor pintle 28. Pump rotor 38 preferably contains five ball bearings 52 which are nested radially about pump rotor 38. Similarly, motor rotor 50 preferably contains five ball bearings 54 which are nested radially about motor rotor 50. Linear movement of the motor rotor ball bearings 54 is controlled through cam ring 40 and pump race 42 pivoting about a single point 56 to provide eccentricity about pump pintle 26 and pump rotor 38. Motor race 44 installed in main housing 24 provides a fixed eccentricity about motor pintle 28 and the coaxial motor rotor 50, which in turn, provides for the output speed of motor vehicle hydrostatic transmission 10. Movement of cam ring 40 is effected by control device 58 which is coupled to speed selection linkage 60. When the speed selection linkage 60 aligns cam ring 40 about a neutral axis as shown in FIG. 2, the transmission 10 is said to be centered or in neutral. As the control device 58 is turned clockwise or counterclockwise from the neutral position, cam ring 40 is shifted off of the neutral axis, and hydraulic fluid is provided through one of the passages 30, resulting in rotation of the motor rotor 50 and forward or reverse rotation of the gear axle 12, through torque transfer in the drive train in drive train housing 14. The amount of displacement of the cam ring 40 from the neutral axis, also referred to as the amount of "stroke", determines the amount of hydraulic fluid delivered, and thus the amount of torque delivered. However, due to manufacturing tolerances typically inherent in the combined neutral position components, an exact and true neutral is rarely achieved in commercially produced hydrostatic transmissions. To provide cam ring 40 with a neutral range, the transmission is provided with a wide band neutral feature, an improvement to which is the focus of this invention.

In general, wide band neutral ensures that when cam ring 40 pivots about the neutral axis or within a specified range of cam ring eccentricity, a neutral condition is achieved.

Although ball bearings 52, 54 operating within pump rotor 38 and motor rotor 50, respectively, will provide hydraulic flow in and around neutral, this hydraulic flow is diverted or bled off of one of the main hydraulic passages 30 feeding motor rotor 50, thus eliminating output rotation to the gear axle 12, commonly referred to as "vehicle creep" in the lawn and garden industry.

When hydraulic flow is transferred to motor rotor 50, ball bearings 54 are forced outwardly when located on the pressure side of the hydraulic loop. This outward thrust of ball bearings 54 is transferred by motor race 44 pressed into main housing 24 which provides a cam angle which translates the linear movement of ball bearings into radial movement of motor rotor 50. Transmittal of output hydraulic power to the input of gear axle 12 is then achieved through a conventional coupling arrangement.

Figure 3:
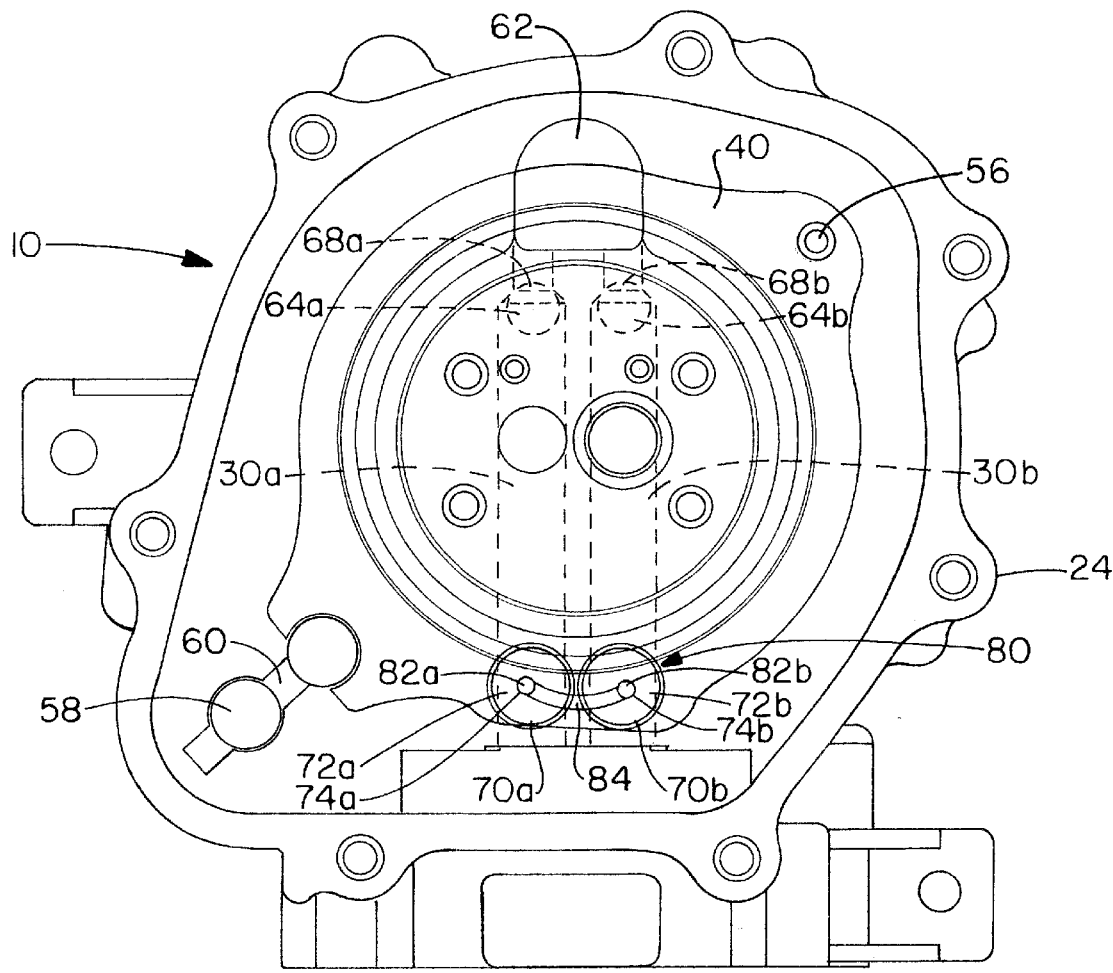
FIG. 3 shows an enlarged cross-section top view of the transmission showing details of the by-pass system.

Attention is now directed to FIGS. 3 through 6, in which the components of the present invention are isolated and disclosed. Referring first to FIG. 3, it is seen that passage 30 of FIG. 1 is really one of a pair of passages 30a, 30b, which together with the motor pintle 28, the pump pintle 26 and the oil sump 62 present a generally closed loop for the flow of hydraulic fluid. Each of the passages 30 contains a check valve comprising a ball bearing 64 held within a range of movement by a dowel 66 and a restricted flow opening 68 near the oil sump end of the passage. Each passage 30 is also provided with a cylindrical recess or bore 70, fitted with a dampening piston 72, and the dampening piston has a restricted passage 74 therethrough wherein highpressure hydraulic fluid from passage 30 may flow if permitted. Each piston 72 is sealed around its circumference in recess 70 by an O-ring 76 or the like. The primary purpose of piston 72 is to dampen vibration of cam ring 40 by biasing the cam ring upwardly, so that it presses against an inner surface 78 of the housing, particularly the input cover 22, which is not shown in FIGS. 3–16, but is clearly seen in FIG. 1. This action of the pistons 72 is well known in the art.

Figure 4:
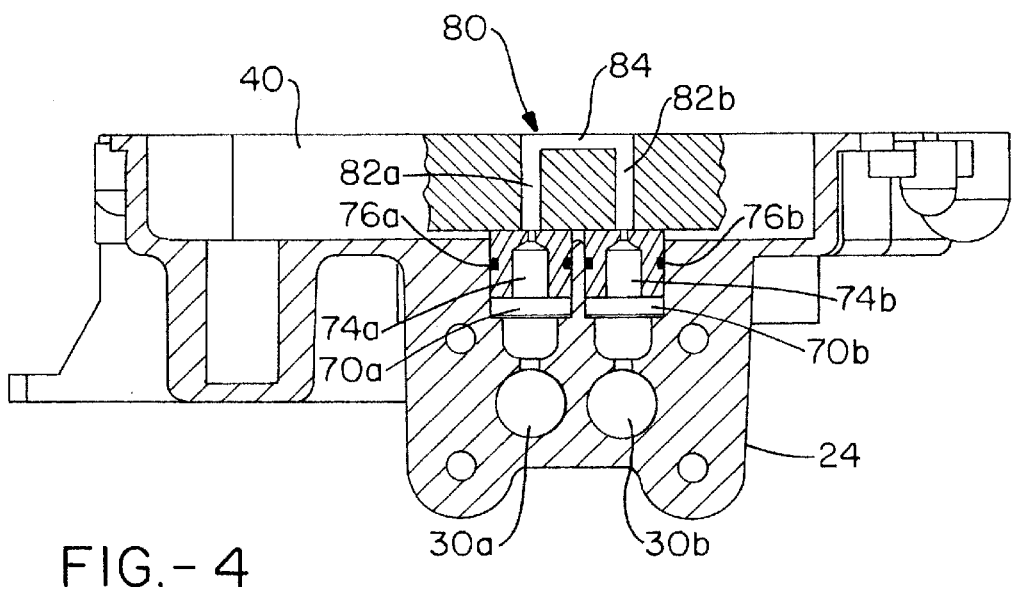
FIG. 4 shows an enlarged side view of details of the by-pass system when in the neutral setting.

When the cam ring 40 is in a neutral position, as in FIGS. 3 and 4, a generally closed conduit 80 communicates the restricted passages 74a, 74b in pistons 72a, 72b, as is illustrated in FIG. 4. The generally closed conduit 80 comprises first and second vertical bores 82a, 82b in cam ring 40, and a channel 84 across the top surface of the cam ring. Since cam ring 40 is held against inner surface 78 of the housing by the dampening pistons 72, the inner surface effectively closes the channel, providing a closed conduit. Any hydraulic fluid in either passage 30a, 30b will be able to flow to through conduit 80 to the other passage, thereby equalizing the pressures of hydraulic fluid in both passages. Since passages 30a, 30b provide flow to and from the motor pintle 28, equalization of the pressures precludes torque delivery to the motor pintle.

Figure 5:
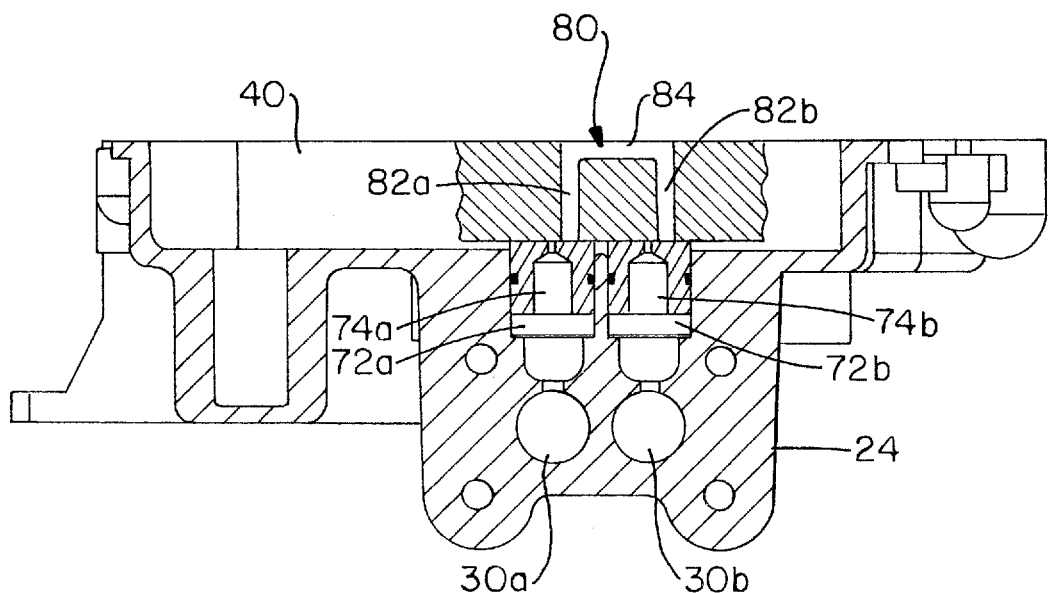
FIG. 5 shows an enlarged side view of details of the by-pass system when in a first displaced setting.

If cam ring 40 is shifted rightwardly, as shown in FIG. 5, bores 82a, 82b are similarly shifted and are no longer in communication with restricted passages 74a, 74b respectively. No flow occurs in conduit 80. In this case, passage 30a acts as the high pressure fluid source for motor pintle 28 and passage 30b acts as the return line to the pump pintle 26. This results in motor rotor 50 rotating in a first direction.

In an analogous manner, if cam ring 40 is shifted leftwardly, as shown in FIG. 5, bores 82a, 82b are similarly shifted and are no longer in communication with restricted passages 74a, 74b respectively. No flow occurs in conduit 80. In this case, passage 30b acts as the high pressure fluid source for motor pintle 28 and passage 30a acts as the return line to the pump pintle 26. This results in motor rotor 50 rotating in a second direction.

It will be recognized that the present invention does not "bleed off" pressure from a high pressure passage to a general collection point, but instead directly communicates the two possible sources of high pressure, thereby equalizing the pressures and eliminating the potential for rotation of the motor rotor, which relies upon pressure differential in order to operate.

It will further be recognized that the relative sizes of the restricted passage 74 and the bore 82 will determine the operational characteristics of the wide band neutral feature, especially the width of the angular range. In general, restricted passage 74 will be much smaller than bore 82. Also, the precision of placement of bores 82 in the cam ring 40 relative to the restricted passages 74 will be crucial to the characteristics of the feature.

Figure 6:
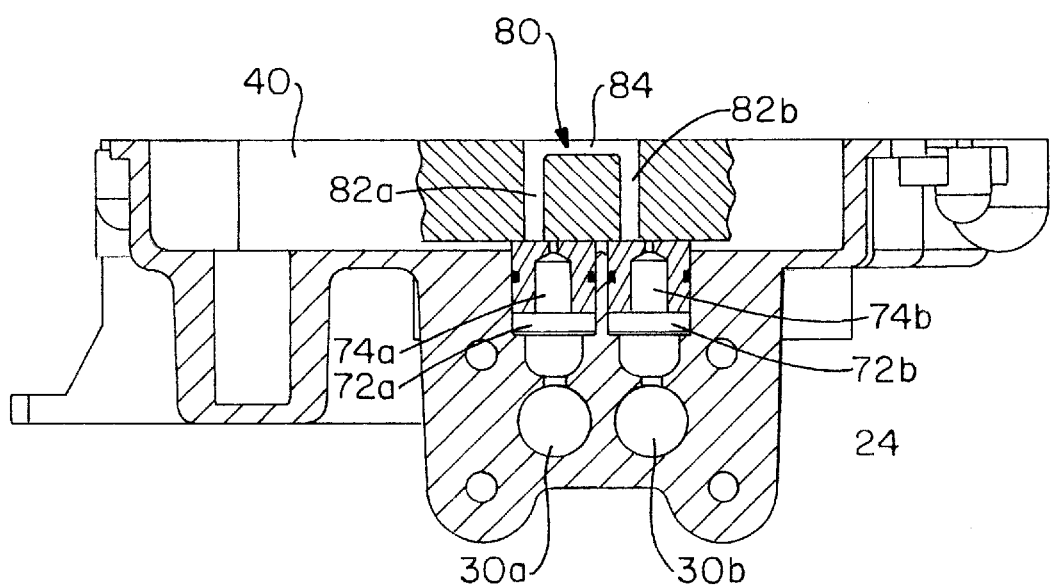
FIG. 6 shows an enlarged side view of details of the by-pass system when in a second displaced setting.

While it is not essential to the invention that the restricted passage 74 be centrally oriented in the piston 72 as shown in FIGS. 4–6, and it is recognized that a peripheral passage between the piston and recess 70 could be effectively used, the criticality of communicating each passage 74 to the corresponding bore 82 in order for the wide band feature to obtain cannot be overemphasized.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A variable displacement rotary fluid pressure pump of the type including a housing assembly and a pair of confronting, axially spaced transverse housing surfaces; a cam ring disposed between said housing surfaces, said cam ring being pivotable about a fixed point to define a neutral position, and a plurality of displaced positions in response to rotation of a manual control shaft; a rotor assembly disposed within said cam ring, and defining a pair of radially extending bores with a piston having a restricted opening disposed in each of said bores, one of the bores in each of a pair of passages for providing fluid from the rotor assembly to an output drive and returning the fluid to the rotor assembly; said housing assembly including means operable to support said rotor assembly relative to said housing assembly, for rotation about an axis; said housing assembly and said support means cooperating to define fluid passages for directing fluid to the said bores, and further cooperating to define outlet fluid passages for directing fluid from certain other said bores; characterized by:

(a) the cam ring having a pair of bores therethrough, with a channel formed on a first surface of the cam ring communicating the pair of bores;

(b) the cam ring and an inner surface of the housing assembly cooperating in close proximity to effectively close the periphery of the channel and provide an essentially closed conduit between the bores;

(c) the essentially closed conduit defining a fluid passage within the cam ring; and (d) the restricted openings in the pistons being disposed such that, when the cam ring is in any of the plurality of displaced positions, fluid communication between the restricted openings is substantially prevented and, as the cam ring is displaced from the displaced position toward the neutral position, fluid communication between the restricted openings is gradually opened.

2. The pump of claim 1 wherein each of the restricted openings has a diameter which is substantially smaller than the diameter of the bore with which it is in communication while the cam ring is in the neutral position.

3. The pump of claim 1 wherein the inner surface of the housing assembly used to essentially close the periphery of the cam ring channel is on the input housing.

4. The pump of claim 1 wherein the bores on the cam ring at the surface thereof opposite the first surface register atop the restricted openings when the cam ring is in the neutral position.

5. The pump of claim 1 wherein the pistons are proximate to a point where the fluid passages supplying fluid to and removing fluid from the output drive are connected with the output drive.

* * * * *